United States Patent
Kim (10) Patent No.: US 11,250,280 B2
(45) Date of Patent: Feb. 15, 2022

(54) OCCUPANT SERVICE PROVISION APPARATUS AND A METHOD OF CONTROLLING THE SAME

(71) Applicants: HYUNDAI MOTOR COMPANY, Seoul (KR); KIA MOTORS CORPORATION, Seoul (KR)

(72) Inventor: Jong Hyuk Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/996,650

(22) Filed: Aug. 18, 2020

(65) Prior Publication Data

US 2021/0342610 A1 Nov. 4, 2021

(30) Foreign Application Priority Data

Apr. 29, 2020 (KR) .................. 10-2020-0052192

(51) Int. Cl.
*G06K 9/00* (2006.01)
(52) U.S. Cl.
CPC ................. *G06K 9/00838* (2013.01)
(58) Field of Classification Search
CPC ................................................ G06K 9/00838
USPC ........................................................ 382/103
See application file for complete search history.

(56) References Cited

U.S. PATENT DOCUMENTS

| 2014/0340498 | A1 | 11/2014 | Plagemann | |
| 2014/0373446 | A1* | 12/2014 | Weidenbacher | E05F 15/74 49/31 |
| 2016/0048214 | A1 | 2/2016 | Plagemann | |
| 2016/0355180 | A1* | 12/2016 | Urano | G01S 13/865 |
| 2020/0012871 | A1* | 1/2020 | Lee | G06T 7/70 |

FOREIGN PATENT DOCUMENTS

KR 20150107755 A 9/2015

* cited by examiner

*Primary Examiner* — Stephen P Coleman
(74) *Attorney, Agent, or Firm* — Lempia Summerfield Katz LLC (57) ABSTRACT

An occupant service provision apparatus includes: a recognition unit configured to recognize an occupant and an object from an acquired image of the inside of a vehicle; a matching unit configured to match a specific part of a body of the occupant that is related to the object; a distance-tracking unit configured to track a distance between the matched specific part of the body of the occupant and the object; and a controller. The controller is configured to check whether the tracked distance satisfies a set service condition, to check whether an additional set service condition is present when the set service condition is satisfied, and to control a specific function of the vehicle, corresponding to the set service, when there is no additional set service condition.

18 Claims, 6 Drawing Sheets

OCCUPANT SERVICE PROVISION APPARATUS AND A METHOD OF CONTROLLING THE SAME

This application claims the benefit of priority to Korean Patent Application No. 10-2020-0052192, filed on Apr. 29, 2020, which is hereby incorporated by reference as if fully set forth herein.

BACKGROUND

Field of the Disclosure

The present disclosure relates to an occupant service provision apparatus. More particularly, the present disclosure relates to an occupant service provision apparatus and a method of controlling the same for providing a service corresponding to recognition of the movement of an occupant based on information on the distance between an object and the occupant.

Discussion of the Related Art

In general, a vehicle includes convenience technology and features in order to provide various convenience functions to occupants of the vehicle.

However, current convenience technology provides convenience service to all occupants in a generalized manner. Therefore, existing convenience technology has a problem in that it is not possible to provide individualized service optimized for each of the occupants.

Recently, technologies for monitoring an occupant using an indoor, i.e., an inside or interior camera of a vehicle have been applied to vehicles. These technologies relate to providing a service related to occupant safety, for example, a seat belt or an airbag.

However, such service provision technologies provide only a simple service when monitoring and detecting occupants through an interior camera in a vehicle. Thus, there is a problem in that occupant satisfaction with the simple service may be low.

SUMMARY

Accordingly, there is a need to develop an occupant service provision apparatus for recognizing movement of an occupant based on a specific object and for providing an occupant-customized service corresponding to the movement of the occupant.

An object of the present disclosure is to provide an occupant service provision apparatus and a method of controlling the same for recognizing movement of an occupant based on a specific object and providing an occupant-customized service corresponding to the movement of the occupant, thereby improving convenience and safety.

The technical problems solved by the embodiments are not limited to the above technical problems. Other technical problems, which are not described herein should become apparent to those of ordinary skill in the art from the following description.

To achieve these objects and other advantages and in accordance with the purpose of the disclosure, as embodied and broadly described herein, an occupant service provision apparatus is disclosed. The occupant service provision apparatus includes: a recognition unit configured to recognize an occupant and an object from an acquired image of an inside of a vehicle; a matching unit configured to match a specific part of a body of the occupant that is related to the object; a distance-tracking unit configured to track a distance between the matched specific part of the body of the occupant and the object; and a controller. The controller is configured to check whether the tracked distance satisfies a set service condition, to check whether an additional set service condition is present when the set service condition is satisfied, and to control a specific function of the vehicle, corresponding to the set service condition, when there is no additional set service condition.

According to another embodiment, an occupant service providing method of an occupant service provision apparatus is disclosed. The method includes a recognition unit, a matching unit, a distance-tracking unit, and a controller configured to control a specific function of a vehicle. The method includes: recognizing, by the recognition unit, an occupant and an object from an acquired image of an inside of a vehicle; matching, by the matching unit, a specific part of a body of the occupant that is related to the object; tracking, by the distance-tracking unit, a distance between the matched specific part of the body of the occupant and the object; and checking, by the controller, whether the tracked distance satisfies a set service condition. The method also includes, when the set service condition is satisfied, checking, by the controller, whether an additional set service condition is present, and includes, when there is no additional set service condition, controlling, by the controller, a specific function of the vehicle corresponding to the set service condition.

According to another embodiment, a non-transitory computer-readable recording medium has recorded thereon computer-executable instructions for controlling a specific function of a vehicle. The non-transitory computer-readable medium is coupled with a processor configured to execute the computer-executable instructions. The processor is operable to: recognize an occupant and an object from an acquired image of an inside of a vehicle; match a specific part of a body of the occupant that is related to the object; track a distance between the matched specific part of the body of the occupant and the object; check whether the tracked distance satisfies a set service condition; when the set service condition is satisfied, check whether an additional set service condition is present; and when there is no additional set service condition, control a specific function of the vehicle corresponding to the set service condition.

According to another embodiment, a vehicle includes an image acquisition unit configured to acquire an image of an inside of the vehicle. The vehicle further includes an occupant service provision apparatus configured to recognize an occupant and an object from the image of the inside of the vehicle, and to control a specific function of the vehicle, corresponding to a service to be provided based on a distance between the recognized occupant and object. The occupant service provision apparatus: matches a specific part of a body of the occupant that is related to the object when recognizing the occupant and the object from the image of the inside of the vehicle; tracks a distance between the matched specific part of the body of the occupant and the object; checks whether the tracked distance satisfies a set service condition; checks whether an additional set service condition is present when the set service condition is satisfied; and controls a specific function of the vehicle corresponding to the set service, when there is no additional set service condition.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Various embodiments of the present disclosure are described in detail for those of ordinary skill in the art to easily implement the present disclosure with reference to the accompanying drawings. However, the present disclosure may be implemented in various different forms and thus is not limited to these embodiments. To clearly describe the present disclosure, portions that do not concern the description have been omitted in the drawings. Like reference numerals in the specification denote like elements.

Throughout the specification, one of ordinary skill would understand terms such as "include", "comprise", and "have" to be interpreted as inclusive or open rather than exclusive or closed unless expressly defined to the contrary. Further, terms such as "unit", "module", and the like disclosed in the specification mean units for processing at least one function or operation, which may be implemented by hardware, software, or a combination thereof.

Hereinafter, an occupant service provision apparatus and a method of controlling the same which are applicable to embodiments of the present disclosure are described below in detail with reference to FIGS. 1-9. When a component, device, element, or the like of the present disclosure is described as having a purpose or performing an operation, function, or the like, the component, device, or element should be considered herein as being "configured to" meet that purpose or to perform that operation or function. Herein, the phrase "coupled with" is defined to mean directly connected to or indirectly connected through one or more intermediate components. Further, the recognition unit, the matching unit, the distance tracking unit, the controller, and the occupant service provision apparatus described herein may be implemented by one or more processors. The one or more processor may be programmed to perform the noted purpose, operation, or function. Further, the local coordinate system refers to an x and y axis coordinate system. The world coordinate system refers to an x, y, and z axis coordinate system.

Figure 1:
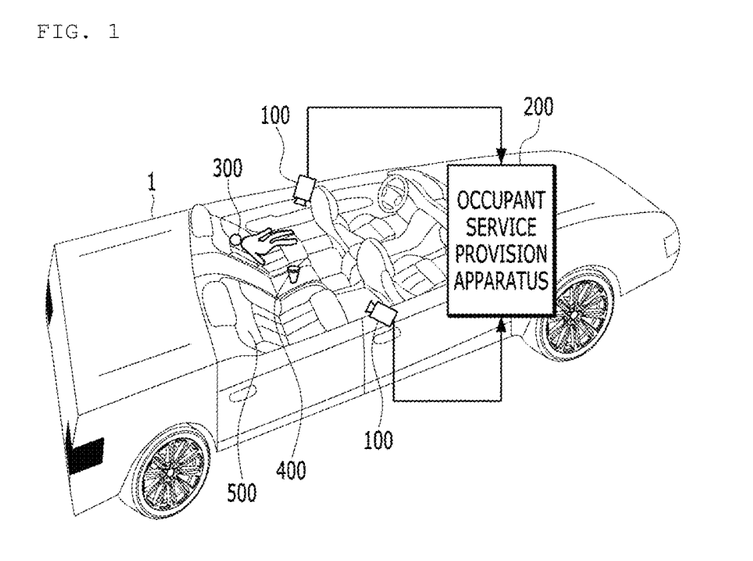
FIG. 1 is a diagram illustrating a vehicle including an occupant service provision apparatus according to an embodiment of the present disclosure.

FIG. 1 is a diagram that illustrates a vehicle including an occupant service provision apparatus according to an embodiment of the present disclosure.

Referring to FIG. 1, a vehicle 1 includes an occupant service provision apparatus according to the present disclosure. The vehicle 1 may include an image acquisition unit 100 for acquiring an image of the inside of the vehicle. The vehicle 1 may include an occupant service provision apparatus 200 for recognizing an occupant 300 and an object 400 from the image of the inside of the vehicle and for controlling a specific function of the vehicle. The specific function corresponds to a service to be provided based on the distance between the recognized occupant 300 and object 400.

In this example, the image acquisition unit 100 may include at least one camera that is installed inside the vehicle 1 and is configured to photograph the inside of the vehicle.

For example, the camera may be positioned to the left or the right of the vehicle 1 based on the front of a seat 500 of the vehicle 1. The camera may be installed to face toward the seat 500 of the vehicle 1.

In this case, the camera may be capable of capturing a 2D image, but the present disclosure is not limited thereto.

When recognizing the occupant 300 and the object 400 from the image of the inside of the vehicle, the occupant service provision apparatus 200 may: match a specific part of a body of the occupant 300 that is related to the object 400; may track a distance between the matched specific part of the body of the occupant 300 and the object 400; may check whether the tracked distance satisfies a set service condition; may check whether an additional set service condition is present when the set service condition is satisfied; and may control a specific function of the vehicle corresponding to the set service when there is no additional set service condition.

In one embodiment, when recognizing the occupant 300 and the object 400 from the acquired image of the inside of the vehicle, the occupant service provision apparatus 200 may adjust a local coordinate system of the acquired image of the inside of the vehicle to a world coordinate system. Further, the occupant service provision apparatus 200 may recognize an occupant and an object from the image of the inside of the vehicle and may record the positions of the occupant and the object based on the adjusted world coordinate system.

Then, when matching a specific part of a body of the occupant 300 that is related to the object 400, the occupant service provision apparatus 200 may match the specific part of the body of the occupant 300 corresponding to a set service, based on a predefined object 400 when the recognized object 400 is the predefined object 400. The occupant service provision apparatus 200 may record the matched specific part of the body of the occupant 300 and the object 400.

In one embodiment, the predefined object 400 may match one specific part or a plurality of specific parts of the body of the occupant 300. The plurality of specific parts that match one object 400 may be predefined for different respective set services.

For example, when the object 400 is a cup, the object 400 may match the hand and the head of the occupant 300. In one example, a cup-holder-opening service may be preset for matching the object 400 and the occupant 300.

In another example, when the object 400 is a cellular phone, the object 400 may match the hand and the head of the occupant 300. In one example, a service of adjusting the sound inside a vehicle may be preset for matching the object 400 and the occupant 300.

In another example, when the object 400 is a book, the object 400 may match the hand and the leg of the occupant 300. In one example, a vehicle interior lighting service may be preset for matching the object 400 with the occupant 300.

In another example, when the object 400 is a cigarette, the object 400 may match the hand and the head of the occupant 300. In one example, a sunroof or side-window opening service may be preset for matching the object 400 with the occupant 300.

Then, when the occupant service provision apparatus 200 tracks a distance between the matched specific part of the body of the occupant 300 and the object 400, if the specific part of the body of the occupant 300 and the object 400 match each other, the occupant service provision apparatus 200 may track and record the distance therebetween in real time.

When checking whether the tracked distance satisfies a set service condition, the occupant service provision apparatus 200 may check whether the tracked distance reaches a predefined threshold distance. When the tracked distance reaches the predefined threshold distance, the occupant service provision apparatus 200 may confirm that the tracked distance satisfies the set service condition.

Then, when the occupant service provision apparatus 200 checks whether an additional set service condition is present, if an additional set service condition is present, the occupant service provision apparatus 200 may track the distance between an additionally matched specific part of the body of the occupant 300 and the object 400 and may check whether the tracked distance satisfies the additional set service condition. When the tracked distance satisfies the additional set service condition, the occupant service provision apparatus 200 may check whether another additional set service condition is present. In this case, when another additional set service condition is not present, the occupant service provision apparatus 200 may control a specific function of the vehicle 1, corresponding to the additional set service.

In one embodiment, when checking whether the tracked distance satisfies the additional set service condition, the occupant service provision apparatus 200 may check whether the tracked distance reaches a predefined threshold distance. When the tracked distance reaches the threshold distance, the occupant service provision apparatus 200 may confirm that the tracked distance satisfies the additional set service condition.

When the occupant service provision apparatus 200 checks whether another additional set service condition is present, if another additional set service condition is present, the occupant service provision apparatus 200 may again perform the procedure of tracking the distance between an additionally matched specific part of the body of the occupant 300 and the object 400. The occupant service provision apparatus 200 may again perform the procedure of checking whether the tracked distance satisfies the additional set service condition.

As such, according to the present disclosure, movement of an occupant based on a specific object may be recognized, and an occupant-customized service corresponding to the recognized movement may be provided. Thereby, convenience and safety are improved.

In other words, according to the present disclosure, the intended behavior of a user based on a specific object may be recognized through a rear camera for a vehicle. Accordingly, customized convenience and safety service may be provided.

For example, according to the present disclosure, a cup holder deployment and driver notification service may be provided when an occupant drinks a beverage.

In this case, the occupant service provision apparatus 200 may recognize the hand of the occupant 300 and a cup, as the object 400 from the image of the inside of the vehicle. The occupant service provision apparatus 200 may match the hand of the occupant 300 to the cup and may track a distance between the hand of the occupant 300 and the cup, as the object 400. When a predetermined distance is satisfied, the occupant service provision apparatus 200 may prepare for connection with the head, as a body part of the occupant 300 that is related to the cup, as the object 400. The occupant service provision apparatus 200 may provide a cup holder deployment service that includes: providing a query or notification about opening the cup holder when the cup approaches the head when the distance between the hand and the cup is 0; and controlling a cup holder to automatically open or to open according to a voice command result when a distance between the hand, the cup, and the head is 0.

In another example, the present disclosure may also provide a vehicle interior sound mute service during a phone call by an occupant.

In this case, the occupant service provision apparatus 200 may recognize the hand of the occupant 300 and a cellular phone, as the object 400 from the image of the inside of the vehicle. The occupant service provision apparatus 200 may match the hand of the occupant 300 and the cellular phone and may track the distance between the hand of the occupant 300 and the cellular phone, as the object 400. When a predetermined distance is satisfied, the occupant service provision apparatus 200 may prepare for connection with the head, as a body part of the occupant 300 that is related to the cellular phone, as the object 400. The occupant service provision apparatus 200 may provide a sound mute service that includes reducing a volume of sound when the cellular phone approaches the head of the occupant 300 when a distance between the hand and the cellular phone is 0. The occupant service provision apparatus 200 may control a sound device to mute the sound inside the vehicle when a distance between the hand, the cellular phone, and the head is 0.

In another example, the present disclosure may provide a vehicle interior lighting service when an occupant reads.

In this case, the occupant service provision apparatus 200 may recognize the hand of the occupant 300 and a book, as the object 400 from the image of the inside of the vehicle. The occupant service provision apparatus 200 may match the hand of the occupant 300 with the book and may track the distance between the hand of the occupant 300 and the book, as the object 400. When a predetermined distance is satisfied, the occupant service provision apparatus 200 may prepare for connection with the leg, as a body part of the occupant 300 that is related to the book as the object 400. The occupant service provision apparatus 200 may provide a lighting service that includes checking the current amount of external light when the book approaches the leg within a predetermined distance in the state in which the distance between the hand and the book is 0. The occupant service provision apparatus 200 may control a lighting device to turn on a light inside the vehicle when the checked external light amount is equal to or less than a predetermined amount of light.

In another example, the present disclosure may provide a sunroof or side-window opening service of a vehicle when an occupant smokes.

In this case, the occupant service provision apparatus 200 may recognize the hand of the occupant 300 and a cigarette, as the object 400 from the image of the inside of the vehicle. The occupant service provision apparatus 200 may match the hand of the occupant 300 with the cigarette and may track the distance between the hand of the occupant 300 and the cigarette, as the object 400. When a predetermined distance is satisfied, the occupant service provision apparatus 200 may prepare for connection with the face, as a body part of the occupant 300 that is related to the cigarette, as the object 400. The occupant service provision apparatus 200 may provide a sunroof or side-window opening service that includes enquiring about whether to open a window using voice when the cigarette approaches the face when a distance between the hand and the cigarette is 0. The sunroof or side-window opening service may also include controlling a sunroof or a side-window of the vehicle to automatically open or to open according to a voice command result when a distance between the hand, the cigarette, and the face is 0.

Figure 2:
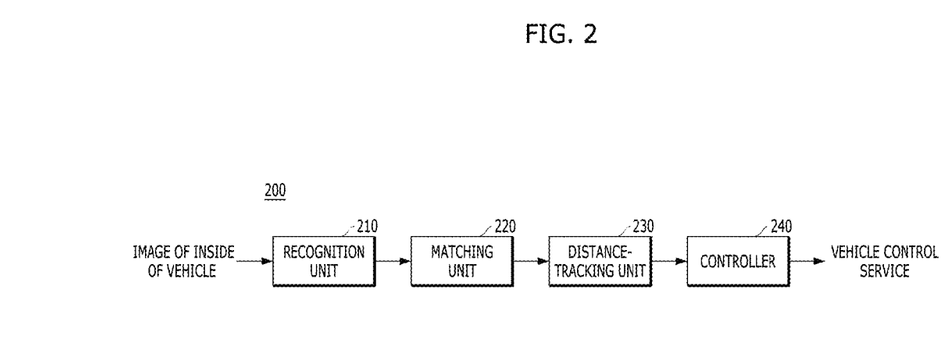
FIG. 2 is a block diagram illustrating the structure of an occupant service provision apparatus according to an embodiment of the present disclosure.

FIG. 2 is a block diagram that illustrates the structure of an occupant service provision apparatus according to an embodiment of the present disclosure.

As shown in FIG. 2, the occupant service provision apparatus 200 according to the present disclosure may include a recognition unit 210, a matching unit 220, a distance-tracking unit 230, and a controller 240.

In one embodiment, the recognition unit 210 may recognize an occupant and an object from the acquired image of the inside of the vehicle.

For example, the recognition unit 210 may acquire the image of the inside of the vehicle from at least one camera that is installed inside the vehicle and is configured to photograph the inside of the vehicle.

In this case, the camera may be positioned to the left or the right of the vehicle based on the front of a seat of the vehicle. The camera may be installed to face toward the seat of the vehicle. However, the present disclosure is not limited thereto.

The camera may be capable of capturing a 2D image, but the present disclosure is not limited thereto.

When recognizing the occupant and the object from the acquired image of the inside of the vehicle, the recognition unit 210 may adjust a local coordinate system of the acquired image of the inside of the vehicle to a world coordinate system. The recognition unit 210 may recognize an occupant and an object from the image of the inside of the vehicle and may record the positions of the occupant and the object based on the adjusted world coordinate system.

In one embodiment, when the recognition unit 210 adjusts the local coordinate system of the image of the inside of the vehicle to the world coordinate system, if a plurality of images of the inside of the vehicle is acquired, the recognition unit 210 may match the plurality of images of the inside of the vehicle. The recognition unit 210 may then adjust the local coordinate system of the matching images of the inside of the vehicle to the world coordinate system.

As necessary, when the recognition unit 210 adjusts the local coordinate system of the image of the inside of the vehicle to the world coordinate system, if a plurality of images of the inside of the vehicle is acquired, the recognition unit 210 may adjust the local coordinate system of each image of the inside of the vehicle to the world coordinate system. The recognition unit 210 may then match the plurality of images of the inside of the vehicle, which are adjusted to the world coordinate system.

When the recognition unit 210 records the position of an occupant, if the recognition unit 210 recognizes the occupant from the image of the inside of the vehicle, the recognition unit 210 may extract skeleton data of the recognized occupant and may record a position corresponding to each part of the body of the occupant based on the skeleton data.

When recording the position of an object, the recognition unit 210 may recognize an object from the image of the inside of the vehicle based on predefined database information or pre-learned database information. The recognition unit 210 may record the position of the recognized object.

In one embodiment, when recording the position of the object, the recognition unit 210 may record the position of the object based on the position of a part of the body of the recognized occupant.

Then, the matching unit 220 may match a specific part of the body of the occupant that is related to the object.

In one embodiment, when matching a specific part of a body of the occupant that is related to the object, the matching unit 220 may match the specific part of the body of the occupant, corresponding to a set service based on a predefined object when the recognized object is the predefined object. The matching unit 220 may record the matched specific part of the body of the occupant and the object.

For example, the predefined object may match one specific part or a plurality of specific parts of the body of the occupant. The plurality of specific parts matching one object may be predefined for different respective set services.

Then, the distance-tracking unit 230 may track a distance between the matched specific part of the body of the occupant and the object.

In one embodiment, when the distance-tracking unit 230 tracks the distance between the matched specific part of the body of the occupant and the object, if the specific part of the body of the occupant and the object match each other, the distance-tracking unit 230 may track and record the distance therebetween in real time.

Then, the controller 240 may check whether the tracked distance satisfies a set service condition. When the set service condition is satisfied, the controller 240 may check whether an additional set service condition is present. In this case, when there is no additional set service condition, the controller 240 may control a specific function of the vehicle, corresponding to the set service.

In one embodiment, when checking whether the tracked distance satisfies the set service condition, the controller 240 may check whether the tracked distance reaches a predefined threshold distance. The controller 240 may confirm that the set service condition is satisfied when the threshold distance is reached.

When the controller 240 checks whether an additional set service condition is present, if the additional set service condition is present, the controller 240 may track the body of the occupant and the object. The controller 240 may check whether the tracked distance satisfies the additional set service condition. When the tracked distance satisfies the additional set service condition, the controller 240 may check whether another additional set service condition is present. In this case, when another additional set service condition is not present, the controller 240 may control a specific function of the vehicle, corresponding to the additional set service.

In one embodiment, when checking whether the tracked distance satisfies the additional set service condition, the controller 240 may check whether the tracked distance reaches a predefined threshold distance. When the tracked distance reaches the threshold distance, the controller 240 may confirm that the tracked distance satisfies the additional set service condition.

When the controller 240 checks whether another additional set service condition is present, if another additional set service condition is present, the controller 240 may again perform the procedure of tracking the distance between an additionally matched specific part of the body of the occupant and the object. The controller 240 may again perform the procedure of checking whether the tracked distance satisfies the additional set service condition.

As such, the present disclosure may provide a vehicle control service appropriate for the movement intended by an occupant by associating interactive points of the body of the occupant based on a specific object through a camera inside a vehicle and by recognizing the intention of the movement based on information on the distance and the order of two or more interactive points.

In other words, according to the present disclosure, vehicle image data may be received and may be matched using a plurality of cameras. An object in a vehicle may be recognized and registered. An occupant and a specific part of a body may be recognized in the vehicle. The object and the specific part of the occupant may be associated and the distance therebetween may be registered. The distance between the associated object and the specific part of the body may be tracked. The application of a service and a rule that are primarily associated with the object may be prepared. Other association relationships may be tracked according to a predefined association relationship rule. When the association condition is satisfied, a service may be provided to the occupant.

Figure 3:
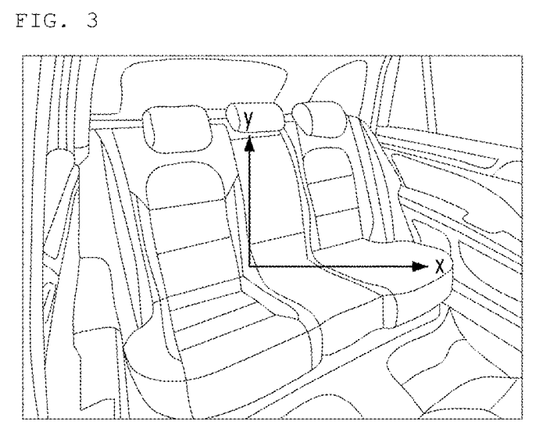
FIG. 3 is a diagram showing a local coordinate system of an image of the inside of the vehicle, acquired from a camera.
Figure 4A:
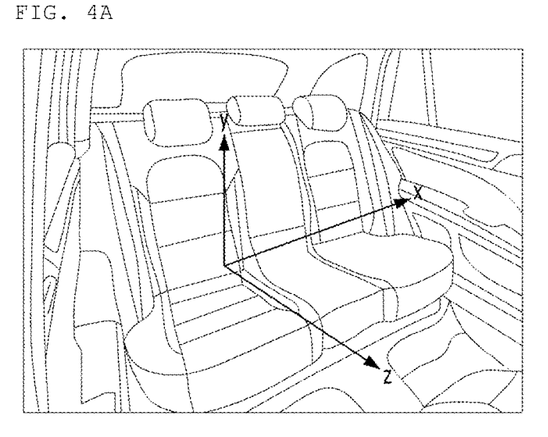
FIGS. 4A and 4B are diagrams showing a world coordinate system of an image of the inside of the vehicle, acquired from a camera.
Figure 4B:
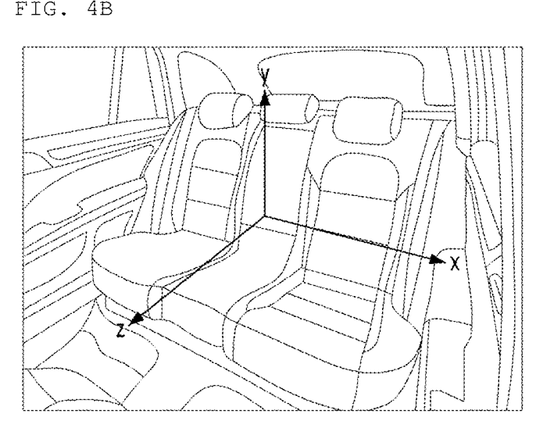

FIG. 3 is a diagram showing a local coordinate system of an image of the inside of the vehicle acquired from a camera. FIGS. 4A and 4B are diagrams showing a world coordinate system of an image of the inside of the vehicle acquired from a camera.

As shown in FIGS. 3, 4A, and 4B, according to the present disclosure, an image of the inside of a vehicle may be acquired from at least one camera that is installed inside the vehicle. The camera is configured to photograph the inside of the vehicle. An occupant and an object may be recognized from the acquired image of the inside of the vehicle.

In one embodiment, the camera may be positioned to the left or the right of the vehicle based on the front of a seat of the vehicle. The camera may be installed to face toward the seat of the vehicle.

According to the present disclosure, as shown in FIG. 3, a local coordinate system of the image of the inside of the vehicle may be adjusted to the world coordinate system as shown in FIGS. 4A and 4B. An occupant and an object may be recognized from the image of the inside of the vehicle based on the adjusted world coordinate system. The position thereof may be recorded.

For example, according to the present disclosure, when a plurality of images of the inside of the vehicle is acquired, the plurality of images of the inside of the vehicle may match each other. The local coordinate system of the matching images of the inside of the vehicle may then be adjusted to the world coordinate system.

As necessary, when a plurality of images of the inside of the vehicle is acquired, the local coordinate system of each image of the inside of the vehicle may be adjusted to the world coordinate system. Then, the plurality of images of the inside of the vehicle, which are adjusted to the world coordinate system, may be matched with each other.

FIGS. 5-8 are diagrams that illustrate a method of controlling an occupant service provision apparatus according to an embodiment of the present disclosure.

Figure 5:
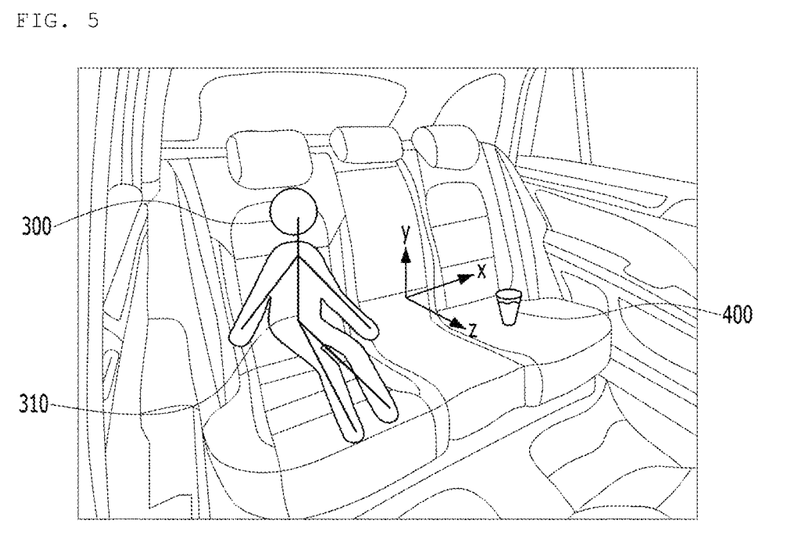
FIGS. 5-8 are diagrams illustrating a method of controlling an occupant service provision apparatus according to an embodiment of the present disclosure.

As shown in FIG. 5, according to the present disclosure, when the occupant 300 is recognized from an image of the inside of the vehicle, skeleton data 310 of the recognized occupant 300 may be extracted. The position corresponding to each part of the body of the occupant may be recorded based on the skeleton data 310.

According to the present disclosure, the object 400 may be recognized from the image of the inside of the vehicle based on predefined database information or pre-learned database information. The position of the recognized object 400 may be recorded.

In one embodiment, according to the present disclosure, when the position of the object 400 is recorded, the position of the object may be recorded based on the position of a part of the body of the recognized occupant 300.

For example, a position corresponding to each part of the body of the occupant 300 and a position of the object 400 may be recorded as shown in Table 1 below.

TABLE 1

| | first occupant-left hand | first occupant-right hand | first occupant-head | |
|---|---|---|---|---|
| object cup (x, y, z) | (x, y, z, length) | (x, y, z, length) | (x, y, z, length) | ... |
| 100, −5, 30 | −300, −3, −50, 500 | −200, 350, −50, 300 | −400, −3, −50, 500 | ... |
| ... | ... | ... | ... | ... |

Figure 6:
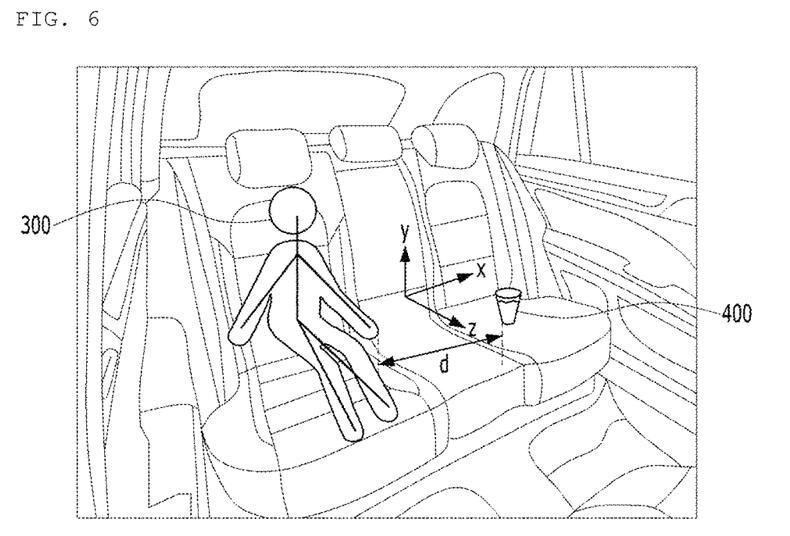

Then, as shown in FIG. 6, according to the present disclosure, when the recognized object 400 is a predefined object 400, the specific part of the body of the occupant 300, corresponding to a set service, may be matched based on the predefined object 400. The distance d between the matched specific part of the body of the occupant 300 and the object 400 may be recorded in real time.

In other words, according to the present disclosure, skeleton points of the occupant 300 and the recognized body point may be connected to each other. The distance d therebetween may be recorded in real time.

In one embodiment, the distance may pertain only to a body part to be connected in terms of the meaning based on an object. A required service may be predefined depending on the distance for each connection.

For example, a required service corresponding to the distance between a part of the body of the occupant 300 and the object 400 may be recorded as shown in Table 2 below.

TABLE 2

| distance | first occupant-left hand | first occupant-right hand | first occupant-head | |
|---|---|---|---|---|
| object cup | 100>: required service<br>50>: required service<br>0: required service | 100>: required service<br>50>: required service<br>0: required service | 100>: required service<br>50>: required service<br>0: required service | ...<br>...<br>... |

Figure 7:
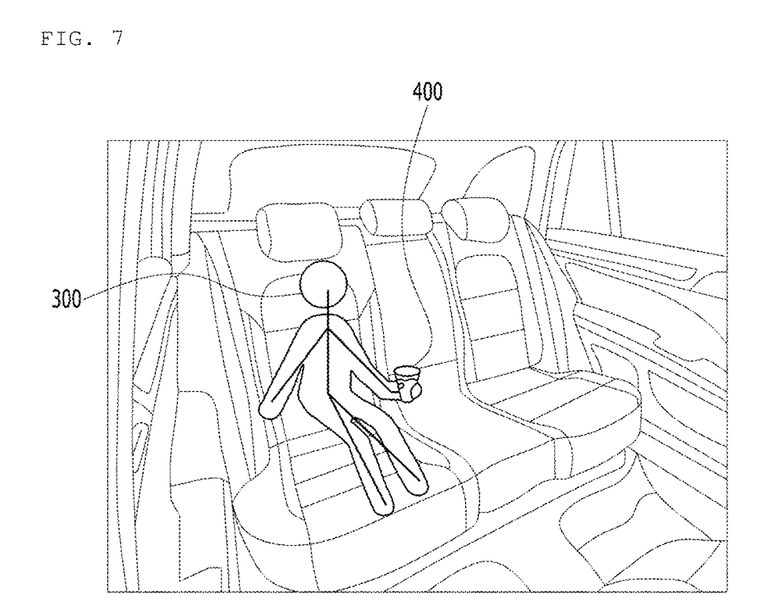
Figure 8:
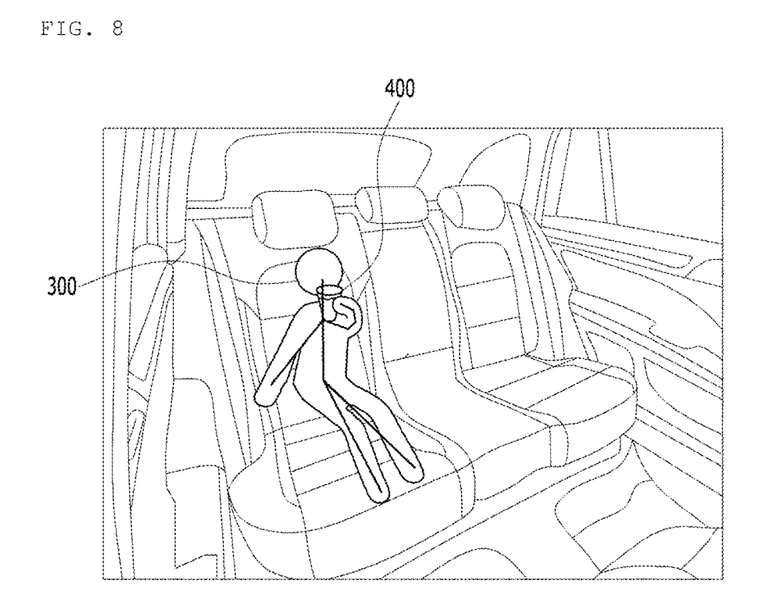

Then, as shown in FIGS. 7 and 8, according to the present disclosure, a specific part of the body and movement of a specific object may be tracked based on the object and a position of the part of the body. The corresponding part of the body and the object may match each other at the time point at which a current distance approaches a specific distance or less. Anticipated movements related thereto may be prepared for, and an associated scenario of tracking corresponding matching elements may begin.

According to the present disclosure, the distance between the associated object and the part of the body may be continuously tracked. When a threshold distance is reached, a prepared vehicle control service may be provided.

For example, a required service corresponding to the distance between the part of the body of the occupant 300 and the object 400 may be provided when a corresponding condition is satisfied, as shown in Table 3 below.

TABLE 3

| distance | first occupant-left hand | first occupant-right hand | first occupant-head | |
|---|---|---|---|---|
| object cup | 100>: required service | 100>: required service | 100>: required service | ... |
| | 50>: required service | 50>: required service | 50 (second condition)>: provide associated required service when first condition is satisfied | ... |
| | 0 (first condition): required service | 0: required service | 0: stop providing associated required service | ... |

In other words, according to the present disclosure, when the specific part of the body of the occupant 300 matches the object 400, the distance therebetween may be tracked and recorded in real time.

According to the present disclosure, as shown in FIG. 7, whether the tracked distance satisfies a first service condition may be checked. In this case, when the first service condition is satisfied, whether a second service condition is present may be checked. When there is no second service condition, a service corresponding to the first condition may be provided.

In one embodiment, when checking whether the tracked distance satisfies the first service condition, the controller 240 may check whether the tracked distance reaches a predefined threshold distance. When the threshold distance is reached, the controller 240 may confirm that the first service condition is satisfied.

According to the present disclosure, as shown in FIG. 8, when the second service condition is present, the distance between an additionally matched specific part of the body of the occupant and the object may be tracked and whether the tracked distance satisfies the second service condition may be checked. When the second service condition is satisfied, a service corresponding to the second service condition may be provided.

In one embodiment, according to the present disclosure, when various conditions are checked, it may be confirmed that the tracked distance satisfies the second service condition. These conditions may include: whether the tracked distance satisfies the second service condition; whether the tracked distance reaches a predefined threshold distance; and when the threshold distance is reached.

According to the present disclosure, when a third service condition is present, the procedure of tracking the distance between an additionally matched specific part of the body of the occupant and the object and checking whether the tracked distance satisfies the third service condition may be performed again.

Figure 9:
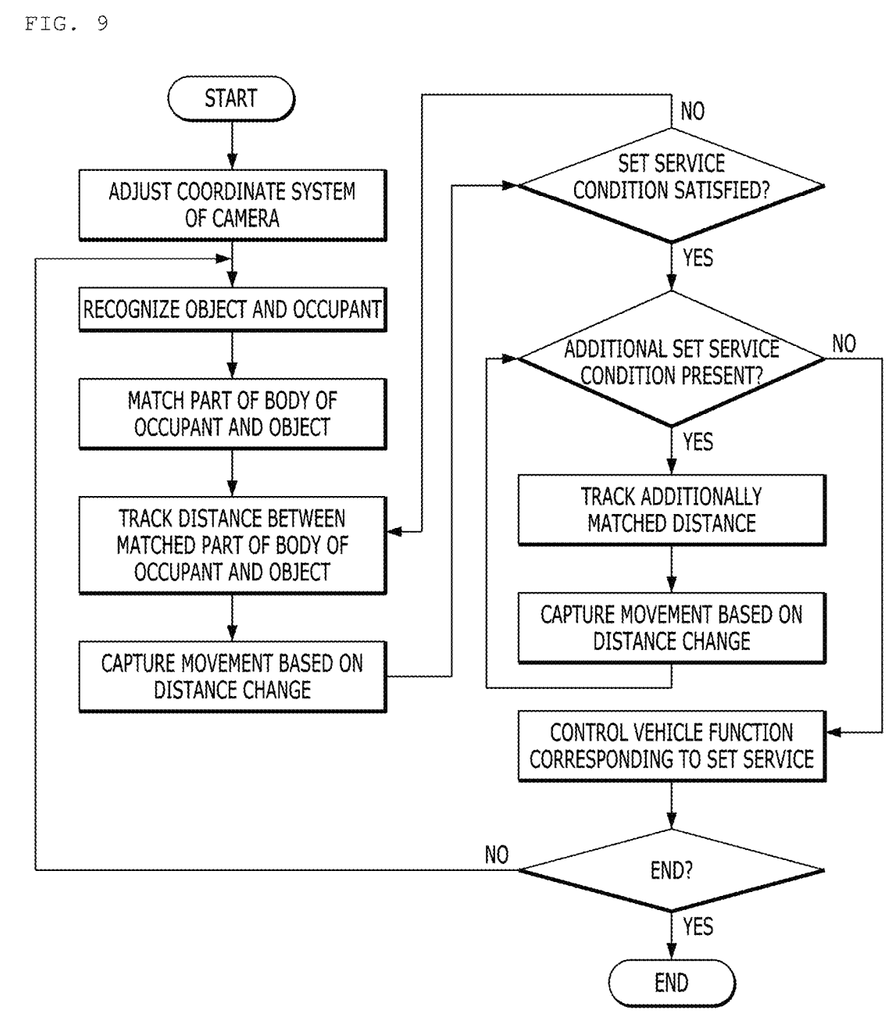
FIG. 9 is a flowchart illustrating a method of controlling an occupant service provision apparatus according to an embodiment of the present disclosure.

FIG. 9 is a flowchart that illustrates a method of controlling an occupant service provision apparatus according to an embodiment of the present disclosure.

As shown in FIG. 9, according to the present disclosure, first, a local coordinate system of an acquired image of the inside of a vehicle may be adjusted to a world coordinate system.

Then, according to the present disclosure, an occupant and an object may be recognized from the image of the inside of the vehicle. The positions of the occupant and the object may be recorded based on the adjusted world coordinate system.

According to the present disclosure, the specific part of the body of the occupant corresponding to a set service, may be matched based on a predefined object. The matched specific part of the body of the occupant and the object may be recorded.

Then, according to the present disclosure, when the specific part of the body of the occupant and the object match each other, the distance therebetween may be tracked and recorded in real time.

Then, according to the present disclosure, movement based on a change in the distance between the specific part of the body of the occupant and the object may be captured.

According to the present disclosure, whether the distance between the specific part of the body of the occupant and the object satisfies a set service condition may be checked.

In one embodiment, according to the present disclosure, whether the distance between the specific part of the body of the occupant and the object reaches a predefined threshold distance may be checked. When the threshold distance is reached, it may be confirmed that the set service condition is satisfied.

Then, according to the present disclosure, when the set service condition is satisfied, whether an additional set service condition is present may be checked.

Then, according to the present disclosure, when there is no additional set service condition, a specific function of a vehicle corresponding to the set service may be controlled.

However, when an additional set service condition is present, the distance between the specific part of the body of the additionally matching occupant and the object may be tracked.

According to the present disclosure, movement based on a change in the distance between the specific part of the body of the occupant and the object may be captured.

Then, according to the present disclosure, whether the distance between the specific part of the body of the additionally matching occupant and the object satisfies the additional set service condition may be checked. In this case, when the additional set service condition is satisfied, a procedure of checking whether a subsequent set service condition is present may be continuously performed. When there is no subsequent set service condition, a specific function of the vehicle corresponding to the additional set service may be controlled.

As such, according to the present disclosure, movement of an occupant may be recognized based on a specific object. An occupant-customized service corresponding to the movement of the occupant may be provided, thereby improving convenience and safety.

In other words, according to the present disclosure, the intended behavior of a user based on a specific object may be recognized through a rear camera for a vehicle. Accordingly, a customized convenience and safety service may be provided.

For example, according to the present disclosure, a cup holder deployment and driver notification service may be provided when an occupant drinks a beverage.

In this case, according to the present disclosure, the hand of the occupant and a cup, as the object, may be recognized from the image of the inside of the vehicle and may be matched with each other. The distance between the hand of the occupant and the cup, as the object, may be tracked. When a predetermined distance is satisfied, a connection with the head, as a body part of the occupant that is related to the cup, as the object, may be prepared for. A cup holder deployment service may be provided that includes providing a query or notification about opening of the cup holder when the distance between the hand and the cup is 0. The cup holder deployment service may also include controlling a cup holder to automatically open or to open according to a voice command result when the distance between the hand, the cup, and the head is 0.

In another example, the present disclosure may also provide a vehicle interior sound mute service during a phone call by an occupant.

In this case, according to the present disclosure, the hand of the occupant 300 and a cellular phone, as the object, may be recognized from the image of the inside of the vehicle. The hand of the occupant 300 and the cellular phone may be matched with each other. The distance between the hand of the occupant and the cellular phone may be tracked. When a predetermined distance is satisfied, a connection with the head as a body part of the occupant may be prepared for. A sound mute service may be provided that includes reducing the volume of sound when the cellular phone approaches the head when the distance between the hand and the cellular phone is 0. The sound mute service may also include controlling a sound device to mute the sound inside the vehicle when a distance between the hand, the cellular phone, and the head is 0.

In another example, the present disclosure may provide a vehicle interior lighting service when an occupant reads.

In this case, according to the present disclosure, the hand of the occupant and a book, as the object may be recognized from the image of the inside of the vehicle and may be matched with each other. The distance between the hand of the occupant and the book may be tracked. When a predetermined distance is satisfied, connection with the leg, as the body part of the occupant that is related to the book, as the object, may be prepared for. A lighting service may be provided that includes checking the current amount of external light when the book approaches the leg within a predetermined distance when a distance between the hand and the book is 0. The lighting service may also include controlling a lighting device to turn on a light inside the vehicle when the checked amount of external light is equal to or less than a predetermined amount of light.

In another example, the present disclosure may provide a sunroof or side-window opening service of a vehicle when an occupant smokes.

In this case, according to the present disclosure, the hand of the occupant and a cigarette, as the object may be recognized from the image of the inside of the vehicle and may be matched with each other. The distance between the hand of the occupant and the cigarette may be tracked. When a predetermined distance is satisfied, connection with the face, as a body part of the occupant that is related to the cigarette, as the object, may be prepared for. A sunroof or side-window opening service may be provided that includes enquiring about whether to open a window using voice when the cigarette approaches the face in the state in which the distance between the hand and the cigarette is 0. The sunroof or side-window opening service may also include controlling a sunroof or a side-window of the vehicle to automatically open or to open according to a voice command result when the distance between the hand, the cigarette, and the face is 0.

According to the present disclosure, the procedures provided by a method of controlling an occupant service provision apparatus according to an embodiment of the present disclosure may be performed using a non-transitory computer-readable recording medium coupled with a processor. The non-transitory computer-readable medium may have recorded thereon a program for executing, by the processor, the method of controlling the occupant service provision apparatus.

An occupant service provision apparatus and a method of controlling the same related to at least one embodiment of the present disclosure as configured above may recognize the movement of an occupant based on a specific object and may provide an occupant-customized service corresponding to the recognized movement. Thereby, convenience and safety are improved.

In other words, according to the present disclosure, the intended behavior of a user based on a specific object may be recognized through an interior camera for a vehicle. Accordingly, a customized convenience and safety service may be provided.

It should be appreciated by persons of ordinary skill in the art that the effects that could be achieved with the present disclosure are not limited to what has been particularly described hereinabove. Other advantages of the present disclosure should be more clearly understood from the detailed description.

The aforementioned present disclosure can also be embodied as computer-readable code stored on a non-transitory computer-readable recording medium. The computer-readable recording medium may include any data storage device that can store data which can thereafter be read by a computer. Examples of the computer-readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), and the like. The non-transitory computer-readable recording medium may be coupled with a processor. The processor may be a central processing unit (CPU), or a semiconductor device that processes and executes the computer-readable code stored in the non-transitory computer-readable recording medium. The processor may be a component in a variety of systems. For example, the processor may be part of a standard personal computer or a workstation. The processor may be one or more general processors, digital signal processors, specifically configured processors, application specific integrated circuits, field programmable gate arrays, servers, networks, digital circuits, analog circuits, combinations thereof, or other now known or later developed devices for analyzing and processing data.

It should be apparent to those having ordinary skill in the art that various modifications and variations can be made in the present disclosure without departing from the spirit or scope of the embodiments. Thus, it is intended that the present disclosure cover the modifications and variations of the embodiment provided they are included within the scope of the appended claims and their equivalents.

What is claimed is:

1. An occupant service provision apparatus comprising:
   a recognition unit configured to recognize an occupant and an object from an acquired image of an inside of a vehicle;

a matching unit configured to match a specific part of a body of the occupant that is related to the object;

a distance-tracking unit configured to track a distance between the matched specific part of the body of the occupant and the object; and a controller configured to check whether the tracked distance satisfies a set service condition, to check whether an additional set service condition is present when the set service condition is satisfied, and to control a specific function of the vehicle corresponding to the set service condition, when there is no additional set service condition, wherein, when matching the specific part of a body of the occupant that is related to the object, the matching unit matches the specific part of the body of the occupant, corresponding to the set service, based on a predefined object when the recognized object is the predefined object, and records the matched specific part of the body of the occupant and the object, wherein the predefined object is one of a cup, a cellular phone, or a book, and wherein the corresponding set service is a cup-holder opening service, adjusting the sound inside a vehicle service, or a vehicle interior lighting service.

2. The occupant service provision apparatus of claim 1, wherein the recognition unit acquires the image of the inside of the vehicle from at least one camera installed inside the vehicle and configured to photograph the inside of the vehicle.

3. The occupant service provision apparatus of claim 1, wherein, when recognizing the occupant and the object from the acquired image of the inside of the vehicle, the recognition unit adjusts a local coordinate system of the acquired image of the inside of the vehicle to a world coordinate system, and recognizes the occupant and the object from the image of the inside of the vehicle and records positions of the occupant and the object based on the adjusted world coordinate system.

4. The occupant service provision apparatus of claim 1, wherein the predefined object matches one specific part or a plurality of specific parts of the body of the occupant; and wherein the specific part or the plurality of specific parts of the body of the occupant is predefined for different respective set services.

5. The occupant service provision apparatus of claim 1, wherein, when tracking the distance between the matched specific part of the body of the occupant and the object, the distance-tracking unit tracks and records the distance between the matched specific part of the body of the occupant and the object in real time when the specific part of the body of the occupant and the object match each other.

6. The occupant service provision apparatus of claim 1, wherein, when checking whether the tracked distance satisfies a set service condition, the controller checks whether the tracked distance reaches a predefined threshold distance, and when the threshold distance is reached, the controller confirms that the set service condition is satisfied.

7. The occupant service provision apparatus of claim 1, wherein, when checking whether the additional set service condition is present, the controller tracks a distance between an additionally matched specific part of the body of the occupant and the object when the additional set service condition is present, checks whether the tracked distance satisfies the additional set service condition, checks whether another additional set service condition is present when the additional set service condition is satisfied, and controls a specific function of the vehicle, corresponding to the additional set service, when the another additional set service condition is not present.

8. The occupant service provision apparatus of claim 7, wherein, when the tracked distance satisfies the additional set service condition, the controller checks whether the tracked distance reaches a predefined threshold distance, and when the threshold distance is reached, the controller confirms that the additional set service condition is satisfied.

9. The occupant service provision apparatus of claim 7, wherein, when checking whether the another additional set service condition is present, the controller again performs a procedure of tracking the distance between the additionally matched specific part of the body of the occupant and the object when the another additional set service condition is present and checking whether the tracked distance satisfies the additional set service condition.

10. An occupant service providing method of an occupant service provision apparatus, the occupant service provision apparatus including a recognition unit, a matching unit, a distance-tracking unit, and a controller configured to control a specific function of a vehicle, the method comprising:

recognizing, by the recognition unit, an occupant and an object from an acquired image of an inside of a vehicle;

matching, by the matching unit, a specific part of a body of the occupant that is related to the object;

tracking, by the distance-tracking unit, a distance between the matched specific part of the body of the occupant and the object;

checking, by the controller, whether the tracked distance satisfies a set service condition;

when the set service condition is satisfied, checking, by the controller, whether an additional set service condition is present; and when there is no additional set service condition, controlling, by the controller, a specific function of the vehicle corresponding to the set service condition, wherein the matching the specific part of the body of the compartment includes:

matching the specific part of the body of the occupant corresponding to the set service based on a predefined object when the recognized object is the predefined object, and recording the matched specific part of the body of the occupant and the object, wherein the predefined object is one of a cup, a cellular phone, or a book, and wherein the corresponding set service is a cup-holder-opening service, adjusting the sound inside a vehicle service, or a vehicle interior lighting service.

11. The method of claim 10, wherein the recognizing the occupant and the object includes:

adjusting a local coordinate system of the acquired image of the inside of the vehicle to a world coordinate system; and recognizing the occupant and the object from the image of the inside of the vehicle and recording positions of the occupant and the object based on the adjusted world coordinate system.

12. The method of claim 10, wherein the tracking the distance includes:

tracking and recording the distance between the matched specific part of the body of the occupant and the object in real time when the specific part of the body of the occupant and the object match each other.

13. The method of claim 10, wherein the checking whether the tracked distance satisfies the set service condition includes:

checking whether the tracked distance reaches a predefined threshold distance, and when the threshold distance is reached, confirming that the set service condition is satisfied.

14. A non-transitory computer-readable recording medium having recorded thereon computer-executable instructions for executing the method of claim 10.

15. The method of claim 10, wherein the checking whether the additional set service condition is present includes:

tracking a distance between an additionally matched specific part of the body of the occupant and the object when the additional set service condition is present;

checking whether the tracked distance satisfies the additional set service condition;

checking whether another additional set service condition is present when the additional set service condition is satisfied; and controlling a specific function of the vehicle, corresponding to the additional set service, when another additional set service condition is not present.

16. The method of claim 15, wherein the checking whether the tracked distance reaches the predefined threshold distance includes checking whether the tracked distance reaches a predefined threshold distance and confirming that the set service condition is satisfied when the threshold distance is reached.

17. The method of claim 15, wherein the checking whether the additional set service condition is present includes:

again, performing a procedure of tracking the distance between the additionally matched specific part of the body of the occupant and the object when another additional set service condition is present and checking whether the tracked distance satisfies the additional set service condition.

18. A vehicle comprising:

an image acquisition unit configured to acquire an image of an inside of the vehicle; and an occupant service provision apparatus configured to recognize an occupant and an object from the image of the inside of the vehicle, and to control a specific function of the vehicle, corresponding to a service to be provided, based on a distance between the recognized occupant and object, wherein the occupant service provision apparatus matches a specific part of a body of the occupant that is related to the object when recognizing the occupant and the object from the image of the inside of the vehicle, tracks a distance between the matched specific part of the body of the occupant and the object, checks whether the tracked distance satisfies a set service condition, checks whether an additional set service condition is present when the set service condition is satisfied, and controls a specific function of the vehicle, corresponding to the set service, when there is no additional set service condition, wherein, when matching the specific part of a body of the occupant that is related to the object, the matching unit matches the specific part of the body of the occupant, corresponding to the set service, based on a predefined object when the recognized object is the predefined object, and records the matched specific part of the body of the occupant and the object, wherein the predefined object is one of a cup, a cellular phone, or a book, and wherein the corresponding set service is a cup-holder-opening service, adjusting the sound inside a vehicle service, or a vehicle interior lighting service.

* * * * *